United States Patent [19]

Yamada et al.

[11] Patent Number: 4,595,270

[45] Date of Patent: Jun. 17, 1986

[54] FINDER SYSTEM

[75] Inventors: Yasuyuki Yamada, Tokyo; Kazuo Fujibayashi, Kanagawa; Yasuhisa Sato, Kanagawa; Hideo Yokota, Kanagawa, all of Japan

[73] Assignee: Canon Kabushiki Kaisha, Tokyo, Japan

[21] Appl. No.: 603,197

[22] Filed: Apr. 23, 1984

[30] Foreign Application Priority Data

Apr. 27, 1983 [JP] Japan ............................ 58-63681[U]

[51] Int. Cl.$^4$ ............................................. G03B 13/10
[52] U.S. Cl. ................................... 354/222; 354/224
[58] Field of Search ............... 354/219, 222, 224, 225, 354/422

[56] References Cited

U.S. PATENT DOCUMENTS

| 3,575,082 | 4/1971 | McClune | 354/225 |
| 4,038,673 | 7/1977 | Schroder | 354/222 |
| 4,104,663 | 8/1978 | Yamazaki et al. | 354/219 X |
| 4,251,158 | 2/1981 | Kimura | 354/224 X |
| 4,256,396 | 3/1981 | Kawaguchi et al. | 354/222 |

Primary Examiner—L. T. Hix
Assistant Examiner—Brian W. Brown
Attorney, Agent, or Firm—Toren, McGeady, Stanger, Goldberg & Kiel

[57] ABSTRACT

The disclosed finder system includes, from front to rear, a first objective lens of negative power, an optical member having a half-mirror, an eyepiece of positive power and a viewfinder frame arranged near the eyepiece to be observed by the eyepiece with the aid of a reflection from the half-mirror. The finder system satisfies the condition $0.2 < d/D < 0.6$ where D is the air separation between the first objective lens and the eyepiece lens and d is the air separation between the optical member and the eyepiece lens. Thus the first objective lens is exchangeable for a second objective lens of different power from that of the first objective lens to change the magnification of the finder system.

5 Claims, 12 Drawing Figures

FINDER SYSTEM

BACKGROUND OF THE INVENTION

1. Field of the Invention

This invention relates to finder systems, and more particularly to finder systems having interchangeable components of different refracting power to change the magnification power of the entire system.

2. Description of the Prior Art

Known prior art cameras have a number of interchangeable objective lenses, for example, standard and telephoto lenses, to permit shooting with two or more different focal lengths. In such a prior art camera, it is desirable to make the magnification of an object image and the angular field coverage of the finder coincide with those on the film plane as the focal length of the objective lens changes.

For example, discretely changeable magnification power finder systems of the reverse Galilean type are known from Japanese Laid-Open Patent Application No. 52-137331, Japanese Utility Model Application No. 54-66541 and U.S. Pat. No. 4,277,158. The operating mechanism for these finder systems is, however, quite complicated, because changing of the magnification power requires axially displacing the two components constituting the objective lens while retracting the other component from the optical path.

SUMMARY OF THE INVENTION

It is, therefore, an ojbect of the present invention to provide a reverse-Galilean finder system of very simple form while still maintaining the possibility of changing the magnification power of the finder to be achieved with the limitation of the size to a minimum.

To accomplish the object of the invention, a principal feature of the finder system is that a first objective lens of negative power is followed by an eyepiece of positive power after a space in which is arranged an optical member having a half-mirror. A viewfinder frame is arranged near the eyepiece to be observed by the eyepiece lens through a reflection of the half-mirror of the optical member. Letting D denote the air separation between the first objective lens and the eyepiece lens, and d the air separation between the optical member and the eyepiece lens, the following condition is satisfied:

$$0.2 < d/D < 0.6$$

When the first objective lens is exchanged by a second objective lens having a different refracting power from that of the first objective lens, the magnification power of the entire system changes.

In a preferred embodiment, the second objective lens is constructed with a positive and a negative component.

In the present invention, in order to achieve a minimization of the variation of the aberrations of the finder system with the change of the focal length, the ratio "m" of the maximum to the minimum possible magnification power of the finder lies in the following range:

$$1 < m \leq 2.5$$

DETAILED DESCRIPTION OF THE PREFERRED EMBODIMENTS

The present invention will next be described in connection with the prior known Albada finder system, but, of course, can be applied to the mark type finder.

Figure 1:
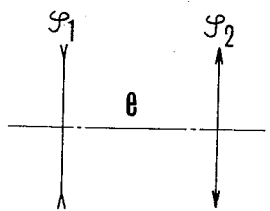
FIGS. 1 to 3 are schematic diagrams illustrating a change of the power distribution in the prior art finder system.

For the purpose of easy understanding, an example of the reverse-Galilean type is described where the finder system constitutes a perfect afocal system. Referring to FIG. 1, for the finder system of which the magnification power is $\gamma$, and in which the interval between the principal points of the objective lens and the eyepiece lens is e, the refractive power $\rho 1$ of the objective lens and the refractive power $\rho 2$ of the eyepiece lens are expressed by the following equations:

$$\rho 1 = -\frac{\rho 2}{\gamma} \quad (1)$$

$$\rho 2 = \frac{1-\gamma}{e} \quad (2)$$

Let us now consider a finder system operating with selection of two different magnification powers for wide angle and telephoto settings. Such is derived by replacing the objective lens constituting part of the aforesaid reverse-Galilean finder system with another objective lens of different refractive power.

For the finder system having a minimum magnification $\gamma W$ and a maximum magnification $\gamma T$ with the principal point intervals eW and eT between the objective lens and the eyepiece when in the wide angle and telephoto positions repsectively, while the refractive power $\rho 2$ of the eyepiece is constant with the change of the magnification, from equations (1) and (2) we have the following equations for the refractive powers $\rho 1W$ and $\rho 1T$ of the objective lens when in the wide angle and telephoto positions respectively and for the refractive power $\rho 2$ of the eyepiece lens:

$$\rho 1W = -\frac{\rho 2}{\gamma W} \quad (3)$$

$$\rho 1T = -\frac{\rho 2}{\gamma T} \quad (4)$$

-continued $$p2 = \frac{1 - \gamma W}{eW} = \frac{1 - \gamma T}{eT} \quad (5)$$

Under the conditions that $\gamma T < 1$ and $\gamma T > \gamma W$, from the equations (3) and (4), $$\frac{\gamma 1T}{\gamma 1W} = \frac{p1W}{p1T} > 1 \therefore p1W > p1T \quad (6)$$

and from equation (5)

$$\frac{1 - \gamma W}{1 - \gamma T} = \frac{eW}{eT} > 1 \therefore eW > eT \quad (7)$$

It is to be understood from the equations (6) and (7) that in the case of the reverse-Galilean finder system, to increase the magnification power of the entire system by replacing the objective lens by another or second objective lens of different refractive power, the second objective lens for the telephoto setting lens must be given a weaker refractive power than that of the first objective lens for the wide angle setting, and must be positioned nearer to the eyepiece lens.

Figure 2:
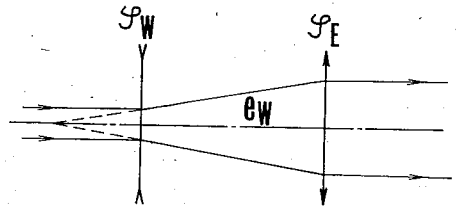
Figure 3:
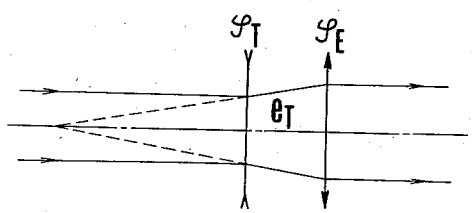

It should be also pointed out that in this case, as illustrated in FIGS. 2 and 3, the value of the refractive power $p1T$ of the objective lens for the telephoto setting and the value of the prinicipal point interval eT between the objective lens and the eyepiece lens are determined unequivocally for the given value of the magnification $\gamma T$ by the equations (4) and (5), and, therefore, have no degree of freedom.

In order to make the finder system compact, when the eW is taken at a smaller value, the required value of the eT becomes still smaller as will be understood from the equation (7). Particularly in application to the Albada finder system, it becomes difficult to secure a space large enough to accommodate the frame reflection mirror between the objective lens and the eyepiece lens.

Also, even when the requirement for the availability of the space the frame reflection mirror occupies is fulfilled, the separation between the frame reflection mirror and the eyepiece lens has to be sufficiently long. Otherwise, the observation of the frame will be objectionably deteriorated.

For the above-described reason, in this case the eW must be taken at a somewhat large value in excess of the desired one, and that a compact finder system is difficult to achieve.

Figure 4:
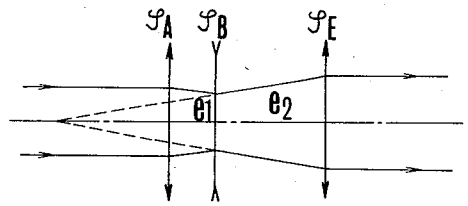
FIG. 4 is a schematic diagram of a power distribution according to the present invention.
Figure 5:
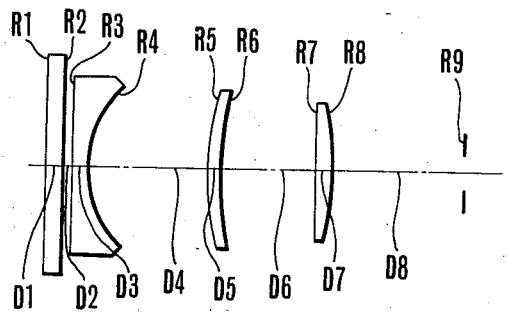
FIGS. 5 and 7 are longitudinal section views of a first specific embodiment of the finder system according to the present invention in the wide angle and telephoto positions respectively.
Figure 6:
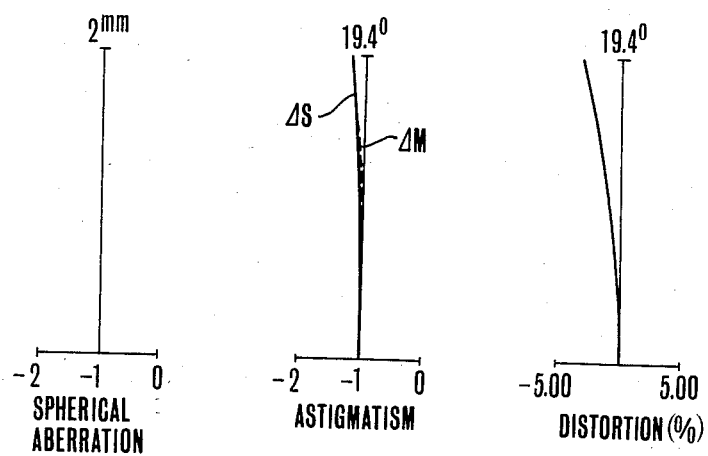
FIGS. 6 and 8 are graphic representations of the aberrations of the finder system of FIGS. 5 and 7 in the wide angle and telephoto positions respectively.
Figure 7:
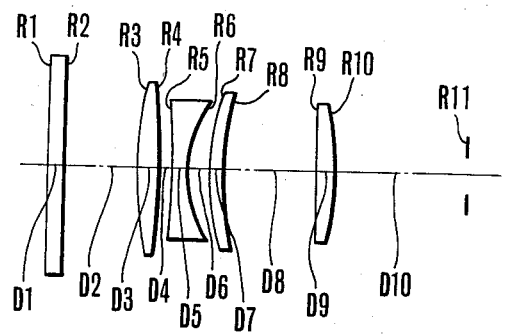
Figure 8:
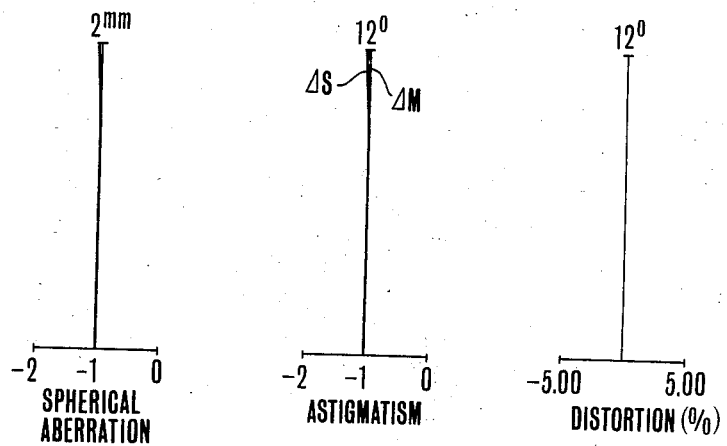
Figure 9:
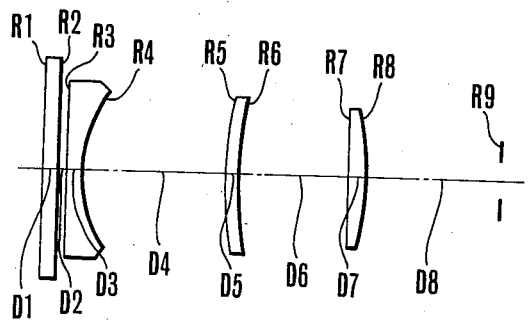
FIGS. 9 and 11 are longitudinal section views of a second specific embodiment of the finder system according to the present invention in the wide angle and telephoto positions respectively.
Figure 10:
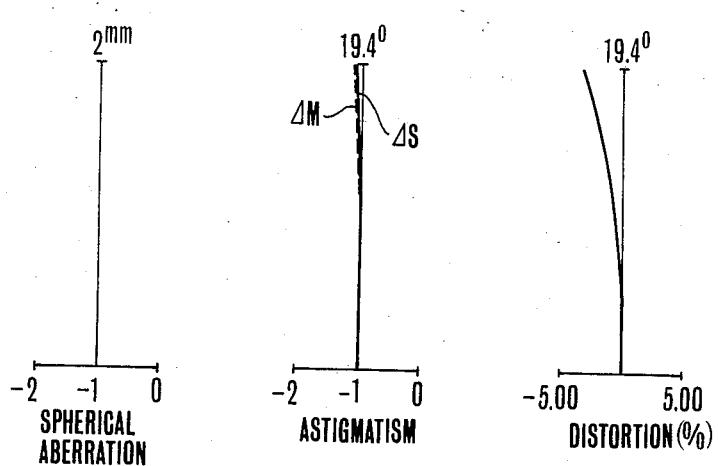
FIGS. 10 and 12 are graphic representations of the aberrations of the finder system of FIGS. 9 and 11 in the wide angle and telephoto positions respectively.
Figure 11:
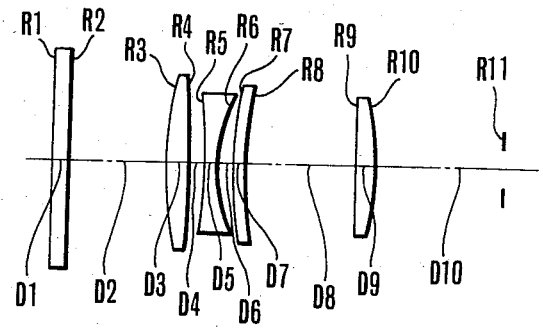
Figure 12:
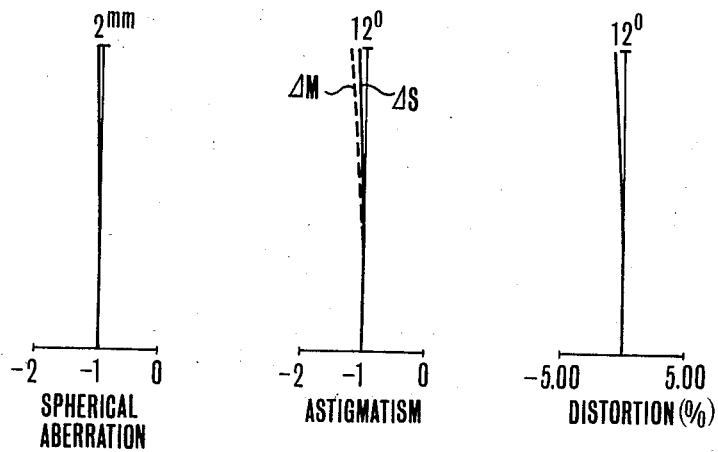

In an embodiment of the present invention illustrated in FIG. 4, the objective lens for the telephoto setting is constructed with two components. The first component has a positive refractive power $pA$ and the second has a negative refractive power $pB$. Hence we have the following equations:

$$\gamma T = \frac{-p2}{pA + pB - e1pApB} \quad (8)$$

$$e2 = \frac{1}{p2} \{1 - \gamma T(1 - e1pA)\} \quad (9)$$

As is evident from the equation (9), the axial separation e2 between the objective lens and the eyepiece lens has some degree of freedom. That is, by choosing appropriate values of the e1 and $pA$, it is possible to widen the axial separation e2. Even for the reverse-Galilean finder, as in this embodiment, and further for the Albada one, an air space large enough to accommodate the frame reflection mirror can be secured between the objective lens and the eyepiece lens. If the above-stated inequalities of condition for all the optical elements are satisfied, it is possible to achieve a magnification power-changeable compact finder system.

The ratio "m" of the maximum to the minimum magnification of the finder system of the invention is, for good stability of aberration correction with the change of the magnification, preferably limited to the following range:

$$1 < m \leq 2.5$$

Two different examples of specific finders systems of the invention can be constructed in accordance with the numerical data given in the following tables for the radii of curvature R, the axial thicknesses and air separations D, the refractive indices N, Abbe numbers $\nu$, of the glasses of the lens elements. The subscripts are numbered consecutively from front to rear.

In these specific numerical examples, the finder system is provided with an aspherical surface to achieve good correction of aberrations. Particularly when the first and second objective lenses have their one lens surface made aspheric, good optical performance is advantageously obtained.

Taking an X-axis as the optical axis and a Y-axis in a direction perpendicular to the optical axis as the direction in which the light advances as positive with an original point at the vertex of the lens surface, an equation for the aspheric surface may be expressed by:

$$X = \frac{\left(\frac{1}{R^*}\right) Y^2}{1 + \sqrt{1 - \left(\frac{Y}{R^*}\right)^2}} + AY^2 + BY^4 + CY^6 + DY^8 +$$

$$EY^{10} + A'Y^3 + B'Y^5 + C'Y^7 + D'Y^9$$

where $R^*$ is the radius of curvature of the paraxial region of the lens surface, and A, B, C, D, E, A', B', C' and D' are aspherical coefficients.

EXAMPLE 1

| (Magnification ratio: 1.64) Wide Angle Setting with Angular Magnification: 0.45 | | | |
|---|---|---|---|
| R1 = ∞ | D1 = 2.00 | N1 = 1.49171 | $\nu 1$ = 57.4 |
| R2 = ∞ | D2 = 1.00 | | |
| R3 = ∞ | D3 = 2.00 | N2 = 1.49171 | $\nu 2$ = 57.4 |
| R*4 = 11.578 | D4 = 15.00 | | |
| R5 = 30.129 | D5 = 1.50 | N3 = 1.52300 | $\nu 3$ = 58.6 |
| R6 = 34.000 | D6 = 12.00 | | |
| R7 = ∞ | D7 = 2.50 | N4 = 1.52300 | $\nu 4$ = 58.6 |
| R8 = −30.631 | D8 = 16.00 | | |
| R9 = Eye Point | | | |

Note:
R3 and R*4 define a first objective lens, R5 and R6 a frame reflection mirror lens, and R7 and R8 an eyepiece lens. R*4 is the aspheric surface.

| Aspherical Coefficients | | | | |
|---|---|---|---|---|
| A | B | C | D | E |
| 0.0 | 0.13218E-03 | 0.67528E-05 | 0.0 | 0.0 |
| A' | B' | C' | D' | |

-continued

| Aspherical Coefficients | | | |
|---|---|---|---|
| 0.18664E-03 | 0.50757E-04 | 0.36556E-06 | 0.0 |

| Telephoto setting with Angular Magnification: 0.738 | | | |
|---|---|---|---|
| R1 = ∞ | D1 = 2.00 | N1 = 1.49171 | ν1 = 57.4 |
| R2 = ∞ | D2 = 9.00 | | |
| R3 = 46.723 | D3 = 3.00 | N2 = 1.49171 | ν2 = 57.4 |
| R*4 = −74.282 | D4 = 2.00 | | |
| R5 = −46.262 | D5 = 1.50 | N3 = 1.49171 | ν3 = 57.4 |
| R6 = 14.078 | D6 = 2.50 | | |
| R7 = 30.129 | D7 = 1.50 | N4 = 1.52300 | ν4 = 58.6 |
| R8 = 34.000 | D8 = 12.00 | | |
| R9 = ∞ | D9 = 2.50 | N5 = 1.52300 | ν5 = 58.6 |
| R10 = −30.631 | D10 = 16.00 | | |
| R11 = Eye Point | | | |

Note:
R3 to R6 define a second objective lens and R4* is the aspheric surface.

| Aspherical Coefficients | | | | |
|---|---|---|---|---|
| A | B | C | D | E |
| 0.0 | 0.10242E-03 | 0.58042E-05 | 0.0 | 0.0 |
| A' | B' | C' | D' | |
| 0.14617E-03 | 0.38004E-04 | 0.35183E-06 | 0.0 | |

EXAMPLE 2

| (Magnification Ratio: 1.64) Wide Angle Setting with Angular Magnification: 0.45 | | | |
|---|---|---|---|
| R1 = ∞ | D1 = 2.00 | N1 = 1.49171 | ν1 = 57.4 |
| R2 = ∞ | D2 = 1.00 | | |
| R3 = ∞ | D3 = 2.00 | N2 = 1.49171 | ν2 = 57.4 |
| R*4 = 14.566 | D4 = 17.86 | | |
| R5 = 46.748 | D5 = 1.50 | N3 = 1.52300 | ν3 = 58.6 |
| R6 = 41.000 | D6 = 14.00 | | |
| R7 = ∞ | D7 = 2.50 | N4 = 1.52300 | ν4 = 58.6 |
| R8 = −33.282 | D8 = 16.00 | | |
| R9 = ∞ (Eye Point) | | | |

Note
R3 and R*4 define an objective lens, R5 and R6 a frame reflection mirror lens, and R7 and R8 an eyepiece lens. R*4 is the aspheric surface.

| Aspherical Coefficients | | | | |
|---|---|---|---|---|
| A | B | C | D | E |
| 0.0 | 0.35239E-03 | 0.64612E-05 | 0.13608E-06 | 0.17168E-08 |
| A' | B' | C' | D' | |
| 0.21139E-03 | 0.10711E-03 | 0.15885E-05 | 0.17304E-07 | |

| Telephoto Setting with Angular Magnification: 0.738 | | | |
|---|---|---|---|
| R1 = ∞ | D1 = 2.00 | N1 = 1.49171 | ν1 = 57.4 |
| R2 = ∞ | D2 = 12.37 | | |
| R3 = 42.773 | D3 = 3.00 | N2 = 1.49171 | ν2 = 57.4 |
| R4 = −185.190 | D4 = 1.99 | | |
| R5 = −70.804 | D5 = 1.50 | N3 = 1.49171 | ν3 = 57.4 |
| R6 = 16.545 | D6 = 2.00 | | |
| R7 = 46.748 | D7 = 1.50 | N4 = 1.52300 | ν4 = 58.6 |
| R8 = 41.000 | D8 = 14.00 | | |
| R9 = ∞ | D9 = 2.50 | N5 = 1.52300 | ν5 = 58.6 |
| R10 = −33.282 | D10 = 16.00 | | |
| R11 = Eye Point | | | |

Note:
R3 to R6 define an objective lens

What we claim:
1. A finder system comprising:
   (a) an eyepiece having a positive refractive power and defining an optical axis;
   (b) a first objective lens having a negative refractive power and arranged on the object side of said eyepiece with an optical axis in coincidence with the optical axis of said eyepiece;
   (c) a viewfinder frame representing a viewfield;
   (d) an optical member having a reflection surface for providing a reflected image of said viewfinder frame to said eyepiece and positioned in a space between said first objective lens and said eyepiece; and
   (e) a second objective lens interchangeable with said first objective lens, having a refractive power different from that of said first objective lens, and including a positive lens and a negative lens.

2. A finder system according to claim 1, wherein when said second objective lens replaces said first objective lens, the entire system changes to a telephoto mode.

3. A finder system according to claim 2, wherein said second objective lens takes a position closer to said optical member than the position of said first objective lens.

4. A finder system according to claim 1, wherein the ratio m of the magnification with said first objective lens to the magnification with said second objective lens satisfies $$1 < m \leq 2.5$$

5. A finder system comprising:
   (a) an eyepiece having a positive refractive power and defining an optical axis;
   (b) a first objective lens comprising a negative lens of strong concave curvature toward said eyepiece and arranged on the object side of said eyepiece with an optical axis in coincidence with said optical axis;
   (c) a viewfinder frame representing a view field;
   (d) an optical member having a reflection surface for providing a reflected image of said viewfinder frame to said eyepiece and positioned in a space between said first objective lens and said eyepiece; and
   (e) a second objective lens arranged to be interchangeable with said first objective lens, having a refractive power different from that of said first objective lens, and comprising, from front to rear, a bi-convex lens and a negative lens of strong concave curvature toward said eyepiece, so that said first objective lens is interchanged by said second objective lens, the entire system changes to a telephoto mode.

* * * * *